(12) United States Patent
Lin

(10) Patent No.: US 9,462,014 B1
(45) Date of Patent: Oct. 4, 2016

(54) SYSTEM AND METHOD FOR TRACKING AND AUDITING DATA ACCESS IN A NETWORK ENVIRONMENT

(71) Applicant: Yeejang James Lin, San Jose, CA (US)

(72) Inventor: Yeejang James Lin, San Jose, CA (US)

(73) Assignee: Datiphy Inc., San Jose, CA (US)

( * ) Notice: Subject to any disclaimer, the term of this patent is extended or adjusted under 35 U.S.C. 154(b) by 0 days.

(21) Appl. No.: 14/694,665

(22) Filed: Apr. 23, 2015

(51) Int. Cl.
*G06F 7/04* (2006.01)
*H04L 29/06* (2006.01)
*H04L 9/32* (2006.01)
*G06F 15/16* (2006.01)
*G06F 21/62* (2013.01)

(52) U.S. Cl.
CPC ............. *H04L 63/308* (2013.01); *H04L 63/08* (2013.01); *G06F 21/6218* (2013.01)

(58) Field of Classification Search
CPC ............................ H04L 63/08; G06F 21/6218
USPC ................ 726/27, 4; 713/165, 168; 709/229
See application file for complete search history.

(56) References Cited

U.S. PATENT DOCUMENTS

| | | | | |
|---|---|---|---|---|
| 2010/0050077 | A1* | 2/2010 | Ryman | G06F 9/455 715/704 |
| 2014/0273964 | A1* | 9/2014 | Noh | H04W 12/08 455/411 |
| 2015/0236863 | A1* | 8/2015 | Castro Castro | H04L 12/1407 370/259 |
| 2015/0288671 | A1* | 10/2015 | Chan | H04L 29/08 726/1 |
| 2015/0381452 | A1* | 12/2015 | Deen | H04L 43/0876 709/224 |

* cited by examiner

*Primary Examiner* — Aravind Moorthy
(74) *Attorney, Agent, or Firm* — Wang Law Firm, Inc.

(57) ABSTRACT

A system and method that correlate business transaction in a system and traffic generated from this business transaction in a network back to a user identity that invoked this business transaction and generated subsequent network traffic. The method enables a user to set up rules for tracking the activities in a system and network traffic and these rules can then be user later for monitoring user activities. The user activities, network traffic, and the user identity are correlated and stored in a data-to-business mapping file. This data-to-business mapping file can be used for auditing events in the system.

14 Claims, 10 Drawing Sheets

SYSTEM AND METHOD FOR TRACKING AND AUDITING DATA ACCESS IN A NETWORK ENVIRONMENT

BACKGROUND OF THE INVENTION

1. Field of the Invention

The present invention generally relates to data security, and more specifically, relates to a system and method that audit information regarding data access.

2. Description of the Related Art

Nowadays, in any commercial and business setting, an action from an end-user at any workstation in a system with many subsystems may trigger innumerous data transactions throughout sub-systems. For example, a person can sit in front of his home computer can visit a website and make a purchase of a product. This purchasing act will cause many actions to happen in one or more systems, for example, the information regarding the person may be recorded, the payment information may be recorded, the information about the product may be retrieved and displayed to the person, and the purchase information may be stored.

The information about these actions may be recorded by the front-end website host but the real users and actions are not associated with the back-end data transactions where data changes are made. Therefore, for a system accessed by thousands people each day, the retrieved information about a database access or communication between two sub-systems cannot be readily associated with the person who caused the actions to happen, neither for the business operations triggering data transactions. Thus, making difficult to audit the meaningful business transactions.

Therefore, there is a need for a system and method that audits transactions and records transactions associated with real users and business operations, and it is to this system the present invention is primarily directed to.

SUMMARY OF THE INVENTION

The system of the present invention provides new capabilities to servers used by enterprises by enabling the servers to associate a recorded data transaction to a business transaction invoked by a user.

In one embodiment, the present invention provides a method for tracking user activities in a network system. The method comprises the steps of detecting, by a tracking server at an entry point, a request from a user, retrieving, by the tracking server from a storage unit, a rule based on an user identification associated with the request, tracking, by the tracking server, user access information associated with the request according to the rule, and recording the user access information in a data-to-business mapping file. The above method also applies to the mapping of business actions and the mapping is also recorded in data-to-business mapping file.

In another embodiment, there is provided a method for creating a rule for tracking user access in a network system. The method comprises the steps of recording, by a tracking server, an entry point identification to the network system, activating an application with a known user identification, tracking, by the tracking server, network transactions on the network system, recording, by the tracking server, identification information associated with the network transactions, and associating the identification information with the entry point identification, identification of the application and identification of business action In another embodiment, there is also provided a server for tracking user activities in a network system. The server comprises a network interface unit for monitoring network traffic, an audit policy unit for controlling rules, a database tracking unit for database access requests and responses, a control unit, and a storage unit in which a non-transitory computer program is stored, When the non-transitory computer program wherein is executed by the control unit, the server performs the steps of detecting a request from a user, retrieving a rule based on an user identification associated with the request, tracking user access information associated with the request according to the rule, and recording the user access and business action information in a data-to-business mapping file.

The present system and methods are therefore advantageous as they enable identification of real user identity associated with information access requests. Other advantages and features of the present invention will become apparent after review of the hereinafter set forth Brief Description of the Drawings, Detailed Description of the Invention, and the Claims.

BRIEF DESCRIPTION OF THE DRAWINGS

Features and advantages of embodiments of the invention will become apparent as the following detailed description proceeds, and upon reference to the drawings, where like numerals depict like elements, and in which.

DETAIL DESCRIPTION OF THE INVENTION

In this description, the term "application" as used herein is intended to encompass executable and non-executable software files, raw data, aggregated data, patches, and other code segments. The term "exemplary" is meant only as an example, and does not indicate any preference for the embodiment or elements described. Further, like numerals refer to like elements throughout the several views, and the articles "a" and "the" includes plural references, unless otherwise specified in the description. The term "system" and "network" are used interchangeably.

Figure 1:
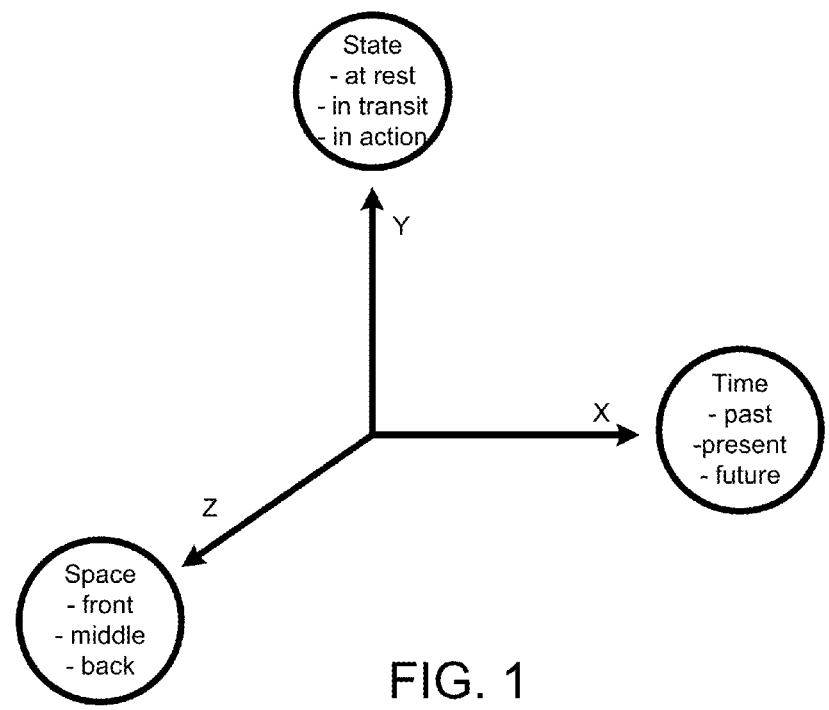
FIG. 1 depicts a 3-D data model representing data in a system.

In an overview, the present invention provides a system and method for collecting data that transit through a computer network, classifying the collected data, associating the collected data with business operations, enabling auditing of the data collected in any part of the network, and identifying a collected data with a business operation. Before describing the unique features of the present invention, a model for data transit in the network is described. When a user access requests a service, e.g. making a purchase through a website on the Internet, many data and data transactions are created. Data flows from one server to another and data transactions occur between the servers. Data connections are established between the servers for these data transactions. The data generated by the system go through different transformation as the data pass through different servers and operate by different applications. FIG. 1 illustrates a 3-D model representing data in a system. The X-axis represents passage of time: past, present, and future. The time progresses moving away from the center of the axes. The time aspect in essential when auditing data, performing security analysis, etc. The Y-axis represents the life cycle of the data. Data are at rest when stored in a database, data are in transit when moving from one server to another server, and data are in action when used by an application. The Z-axis represents the spatial allocation of data. Data are considered to be in the front when they are closer to the end user, for example, in a web server. Data are in the middle when they are passing through some intermediate server. Data are in the back when they are stored in some database in a back end server.

Figure 2:
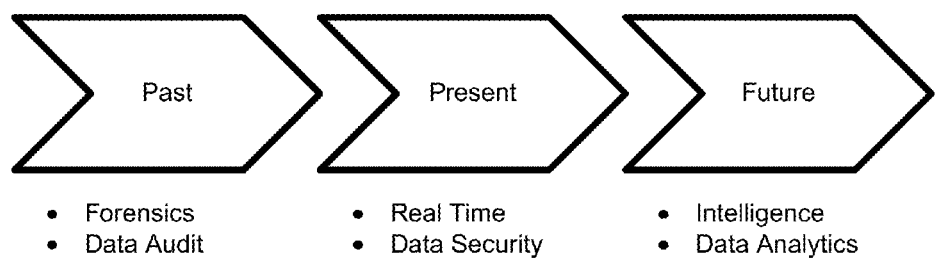
FIG. 2 depicts a model representing data usage in the time domain.

FIG. 2 depicts a model representing data usage in the time domain. The data may be used to learn the events of the past, for example, auditing network traffic data during investigation of a network security breach. The data may also be used to check the system integrity in real time. Finally, the data may be used to predict future, for example, using the current market data to predict future trend for a stock.

Figure 3:
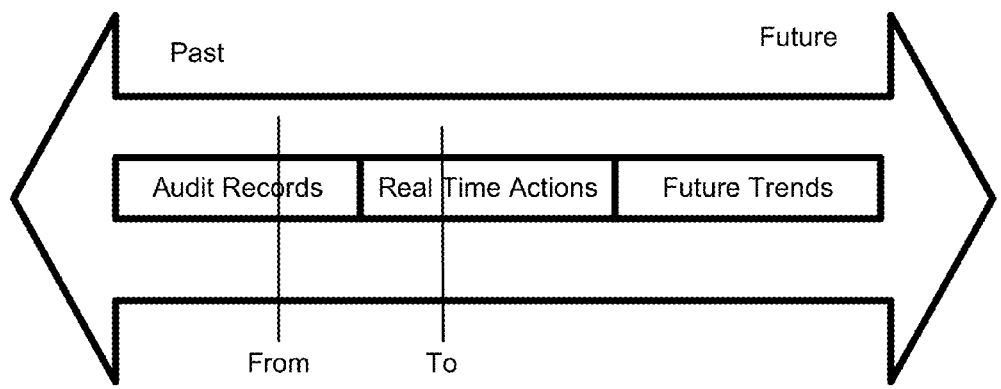
FIG. 3 depicts a use of data in the time domain.

FIG. 3 is a visualization of use of data in the time domain. The data transactions are recorded and stored in the system and the selection of the data transactions for any operation depends on the objective of the operation. For example, if the operation relates to data audit, then the time span, indicated between "From" and "To," of the data transactions of interests should be selected more from the past. If the operation relates to real time actions, such as monitoring a security, then the time span to collect the data should cover more present data transactions.

Figure 4:
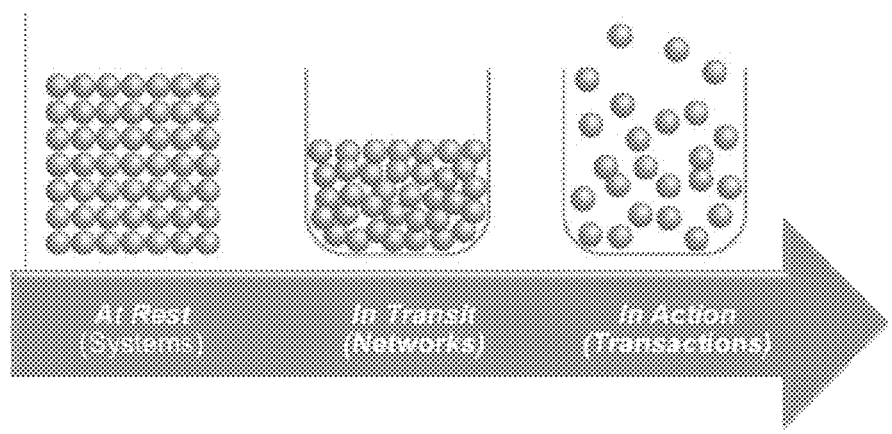
FIG. 4 illustrates state of data at different conditions in a system.

FIG. 4 illustrates the state of data at different conditions in a system using analogy of different state of a material. When the data are at rest, for example, stored in a server, the state of the data is like solid for a material. When the data are in transit, for example, moving through a network, the state of the data is like liquid for the material. Finally, when the data are in action, for example, being processing by applications, the state of the data is like gas for the material.

Figure 5:
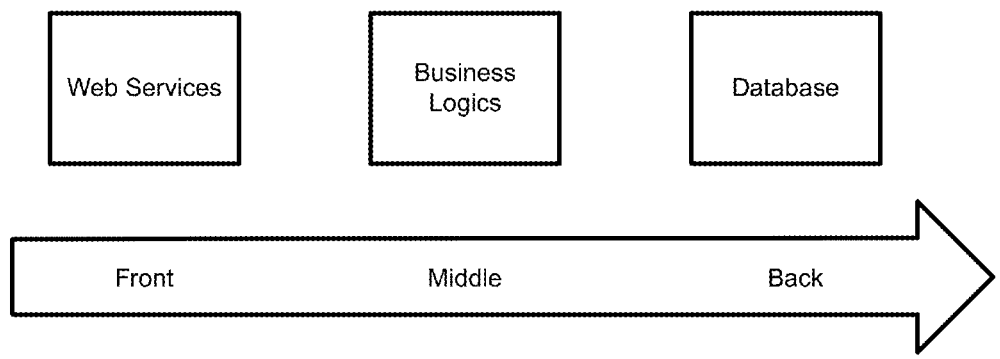
FIG. 5 illustrates a data model based on the physical disposition.

FIG. 5 is a representation of a data model based on the physical disposition. The data used in web services are considered to be in front of the system. The data used in business logics are considered to be in middle of the system. The data stored in the database are considered to be in back of the system.

Figure 6:
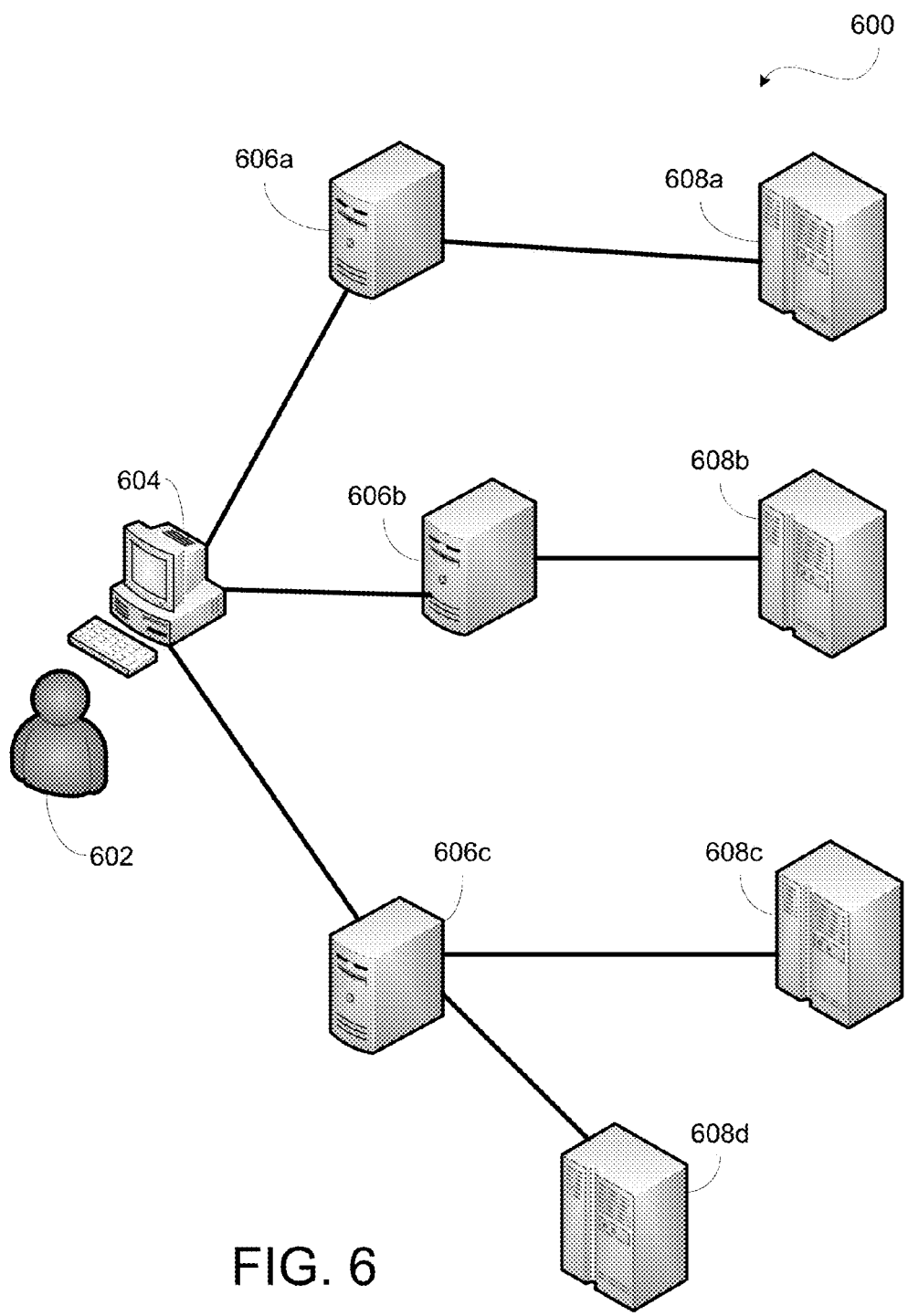
FIG. 6 illustrates architecture of a computer network.

FIG. 6 is architecture of a computer network 600. A user 602 can interact with the system by entering commands through his home computer 604. The home computer 604 can interact with one or more web servers 606a-606c and each web server 606 may be connected to one or more database server 608a-608d. Because the data can be distributed in different locations in the network 600 and also in different state, it is hard to correlate the data in the network 600, i.e., it is difficult to know the impact of a data operation performed by a web server on a database because applications in the front of the system and applications in the back of the system may be developed by different companies and there is no one uniform way to identify and track the data.

Figure 7:
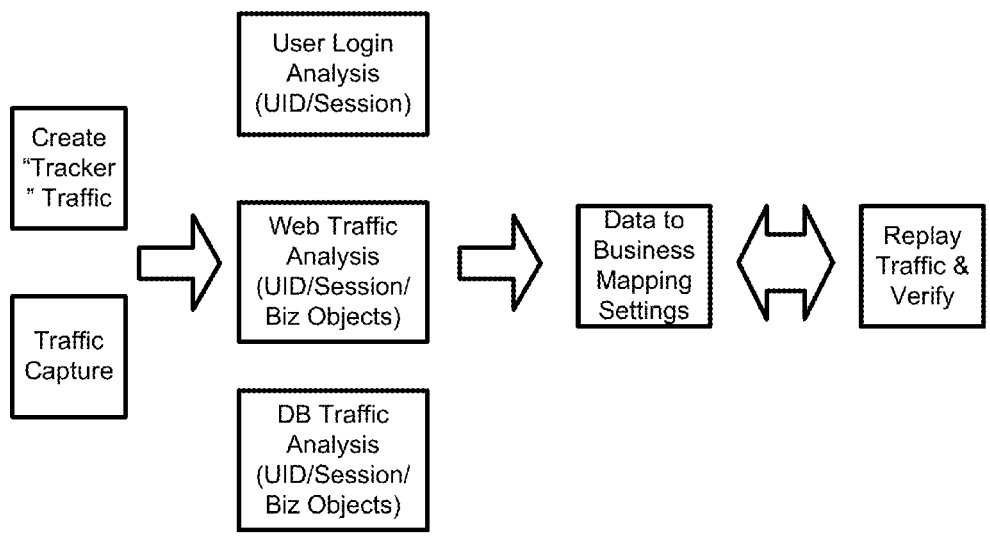
FIG. 7 illustrates a model for mapping user information.

The present invention discloses a method to learning about the data in a system and consequently to develop a set of policies that can be used tracking the data. As shown in FIG. 7, to establish a set of policies that can be applied to the data in the system, it is necessary to learning the "entry" points of the system, i.e., the points that a user interfaces with the system or the commands that the user invokes to use the system. The entry point can be a website, an automatic teller machine (ATM), an application running on a server, etc. From these entry points, a "tracker" traffic is created by invoking a command with a known entity. By tracking the transactions involving this known entity through the user login process, monitoring web traffic, and database traffic, a data-to-business mapping can be captured. For example, the tracking traffic can be a user logging into a county government website and requesting tax information on his property. By knowing this is the business operation, it can be tracked operations in the web server that involve the user identification (ID), the business operation, and the information request operation. It can also be monitored network traffic between the servers after the user invoked the command. Finally, all database requests are monitored and data can related back to the business operation.

Figure 8:
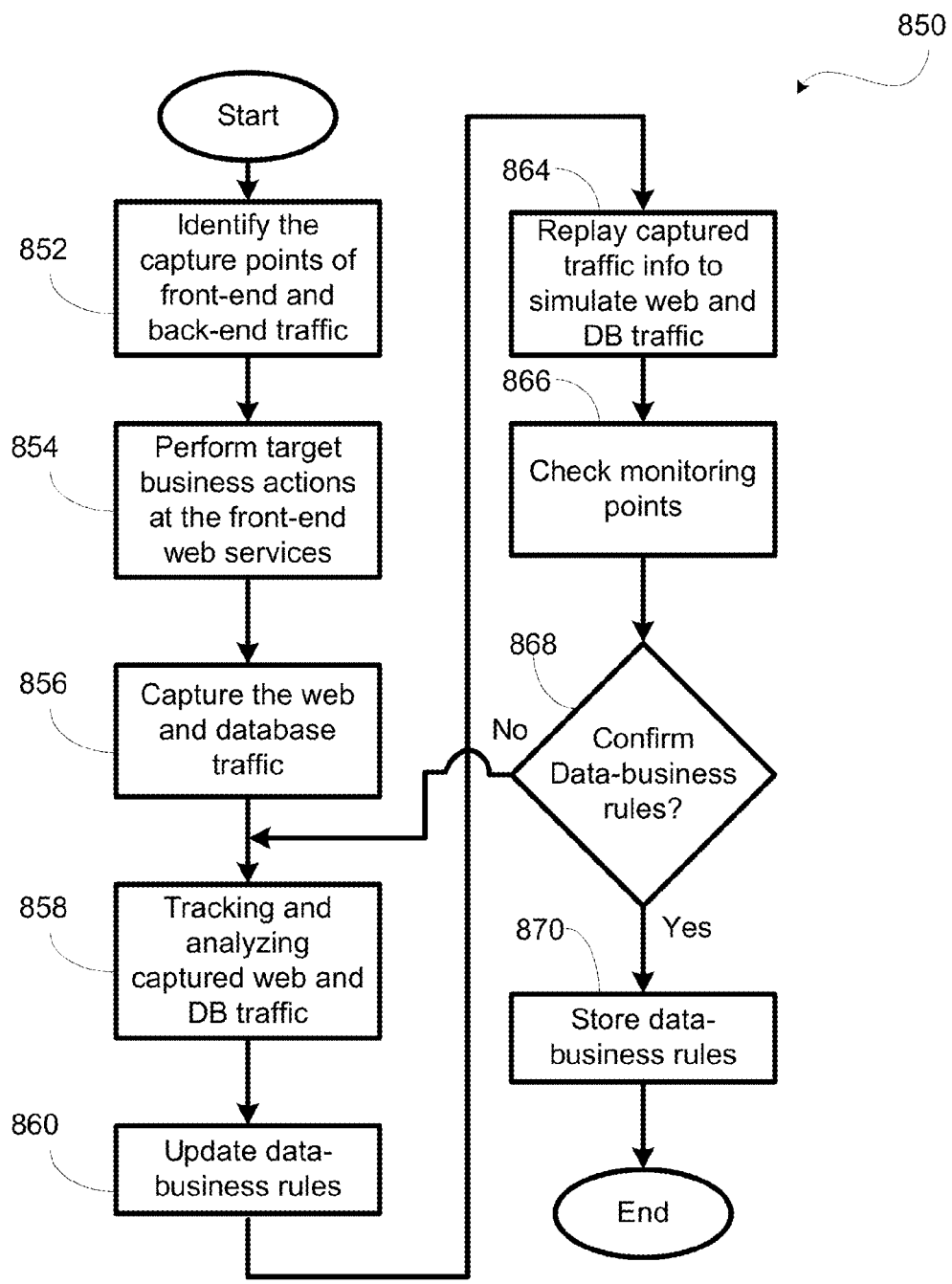
FIG. 8 is a process for setting up rules for a system.

FIG. 8 is a flowchart 850 for a process for learning operations related to a business process. The entry points of the front end and back end traffic need to be identified, step 852, and selected target business actions are executed at the front-end entry point, step 854, which usually is an action taken at a web service. The data traffic from the web and between database servers are captured, step 856, and the captured data traffic are tracked and analyzed, step 858. The captured data traffic is used to create and to update data-business rules, step 860. This captured data traffic is used to simulate the web and database traffic, step 864, and the monitored entry points are checked, step 866, to confirm the data-business rules, step 868. If the data-business rules are not confirmed, then the process is repeated and the data traffic is analyzed again, step 858. If the data-business rules are confirmed, the data-business rules are stored, step 870.

In the system shown in FIG. 6, after a user logs in, a user ID and a session ID are created and subsequent user activities and resulting network activities can be tracked and tied to the business operation (application) and the user ID. As an example, the following information may be collected:

(EntryPoint; UserID; SessionID; AppID; CommandID; ConnectionID; ClientID;)

The above collected information forms a rule in the policy. For each entry point and each application, a rule will be created and this rule will be used in the future to monitor the operations in the system. However, before the rule is set and saved, the tracker traffic is replayed and the rule is used to monitor the data traffic in the system. After the rule is verified, the rule can then be saved and used as part of the policy.

After setting up the policy for the system, the data transactions in the system can be tracked and monitored. Changes in data records before and after being processed by an application can be recorded and observed. Creation and transfer of the data in the system are also recorded and observed.

Figure 9A:
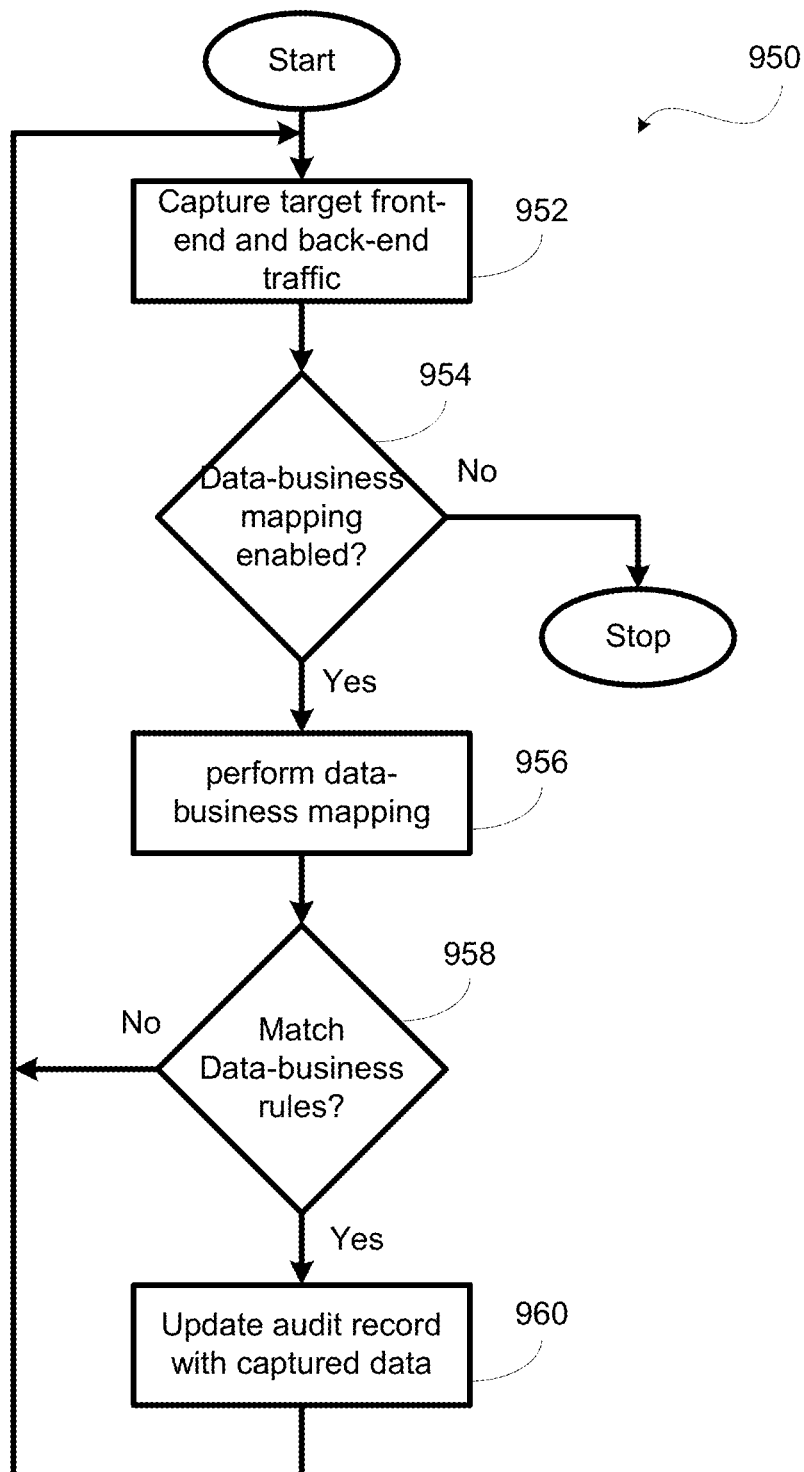
FIG. 9A is a general process for data-business mapping.

FIG. 9A is a general description of a process 950 for mapping user to data collected and to business operation. The process 950 starts with capturing data traffic of business transactions at the front-end and back-end, step 952. After the data are collected, the system checks whether the process 950 is set up for mapping the data collected to business transactions, step 954. If the process 950 has not been set up for data-business mapping, then the process stops. If the data-business mapping is enabled, the collected data are mapped, step 956, and then checked if the data-business mapping matches any data-business rule, step 958. If the collected data match a data-business rule, then the audit record will be updated with the captured data, step 960, and the process 950 repeats. If the collected data do not match any data-business rule, the process 950 starts anew and the collected data may be saved for future consideration whether a new data-business rule is needed.

Figure 9B:
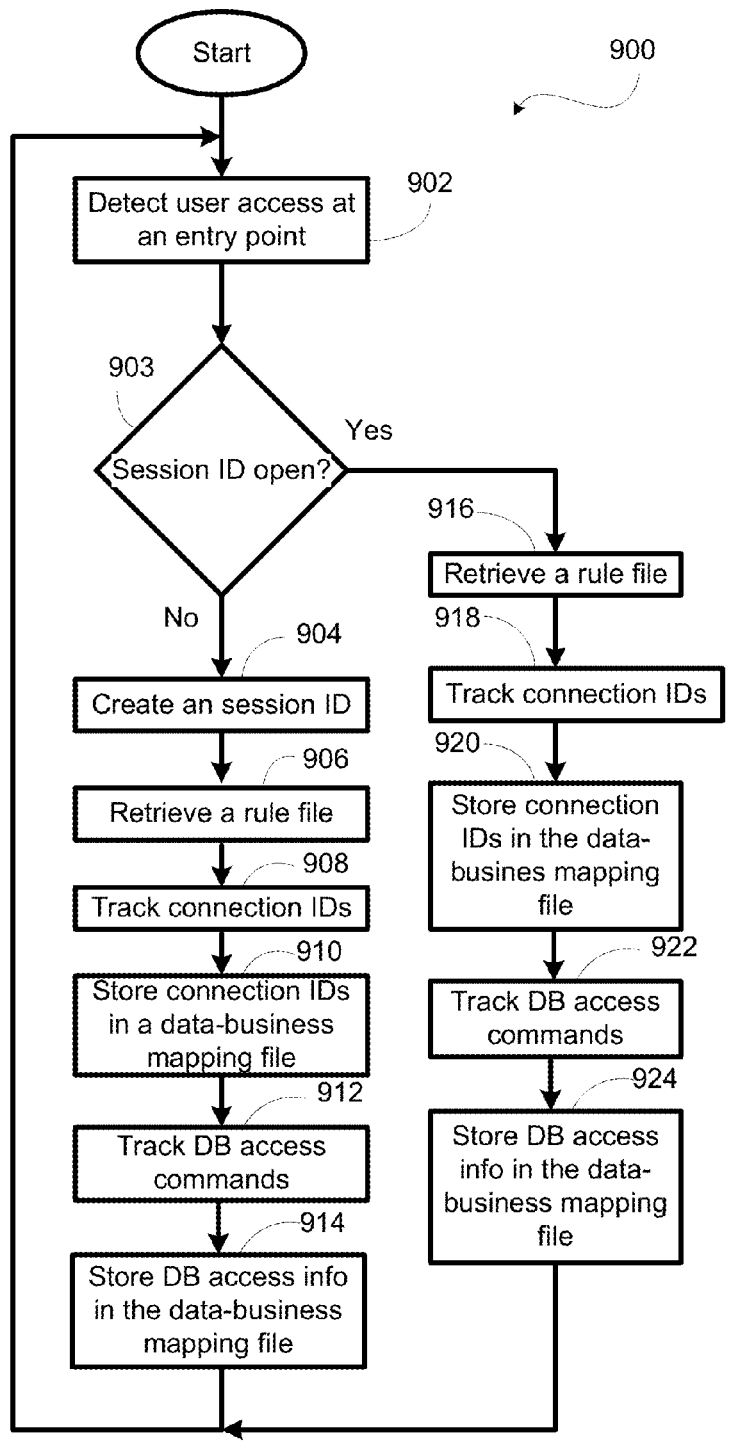
FIG. 9B is a detail process for mapping data-user-business.

FIG. 9B is a flowchart of a detail process 900 for mapping user and business information using the system described above. FIG. 9B expands the process illustrated in step 956 in FIG. 9A. A user accesses the system by invoking a business function at an entry point. When a user access is detected, step 902, the system checks whether there is a session open, step 903. Multiple accesses from a user within a short period of time may be recorded under the same session ID. Generally speaking, a session is defined by time duration; however, other criteria may also be used to define a session, such as geographic region or the IP addresses of the entry points, or combination thereof. For example, if a user accesses the system through an IP address associated with his home address and then 10 minutes later the same user accesses the system through a second IP address associated with his office address, these two accesses, though close in time, will be assigned two different session IDs. If there is no session open, a new session ID may be created, step 904, associated with the user ID and a timer is set and associated with the session ID. A rule for the entry point or entry mode may be retrieved, step 906. If the user accesses the system through a website, a website related rule may be retrieved. The rule is also identified by the business transaction invoked by the user. As the user transacts with the system, data may be created and travel from one server to another server within the system and the connection IDs between the servers are tracked and obtained according to the rule, step 908. The business transaction invoked by the user and identifications associated with user activities generated from the business transaction are also tracked and obtained according to the rule. The connection IDs are stored in a data-to-business mapping file, step 910, along with the user ID and the session ID. The database access requests, which generally correspond to one or more business operations, originated by the user access are also tracked, step 912, and these database access requests are also stored in the data-to-business mapping file 914. The tracking continues for all other user commands.

If there is a session already open when the user accesses the system, the system retrieves a rule from the policy, step 916, according to the manner the user accesses the system. The system tracks the connection ID according to the rule, step 918, and the connection IDs are stored in a data-to-business mapping file, step 920, along with the user ID and the session ID. The database access requests, corresponding to one or more business operations, originated by the user access are also tracked, step 922, and these database access requests are also stored in the data-to-business mapping file 924. When the timer for the session ID runs out, the session is closed, a new session ID will be created for future access, and the data-to-business mapping file is closed and stored. For future accesses, a new session ID and a new data-to-business mapping file will be created.

Below is a simplified description of a web purchase by a user to illustrate data collection and recording according to the present invention. When a user uses his computer to make a purchase on a website on the Internet, the user logs into the website. After the web server authenticates the user, a user ID (UserLoginID) is assigned to the user and a session ID (UserSessionID) is created. The user starts with browsing the products. The browsing request from the user and subsequent network traffic related to a database access request for retrieving product information are all recorded and the user ID for each operation is recorded according to a rule from the a policy set related to the browsing. So, at this point, a data-to-business mapping file would have, for example, UserLoginID, UserSessionID, UserBrowsingID, and DataRetrieveID. Evidently, people skilled in the art would know that many other operations may happen to achieve the browsing operation and a data-to-business mapping file may conceivably contain many more ID information.

After browsing the products, the user may purchase one item and this purchase action causes a new rule to be retrieved. The item is recorded in a purchase database associated with the user and this is done by a database modification request to the purchase database. The ID information associated with the purchase operation and database modification are tracked according to the new rule file. The data-to-business mapping file would record these ID information, UserPurchaseID and DataModifyID.

At the end of his purchase, the user decides to check out and pay for his purchase. Assuming the user is a returning user, the system may have his address in the record. So, the web server retrieves the user information from a user information database and the user information may include the user's home address and the user's credit card information. The operations involved in this check out process may include retrieving the user information from the user information database and the ID information used in this operation, UserInfoRetrieveID, is recorded in the data-to-business mapping file.

If the user decides to use a different payment form, such as different credit card, or send the purchase to his office instead of his home address, the web server enables the user to enter different payment information and different shipping address. This new information will then be recorded in the proper database and different database commands will be used to accomplish these tasks. The ID information related to these transactions, UserDataInputID and DataModifyID, are recorded in the data-to-business mapping file.

All the ID information collected and recorded during the session will be recorded in the data-to-business mapping file and the data-to-business mapping file may have:

(UserLoginID, UserSessionID, BusinessObjIDUserBrowsingID, DataRetrieveID, UserPurchaseID, DataModifyID, UserInfoRetrieveID, UserDataInputID, DataModifyID)

wherein,

UserLoginID is user login identification,

UserSessinID is access session identification,

BusineesObjID is identification of a business command invoked, and

UserBrowingID is browsing session identification.

Inclusion of other identifications depend on the business command invoked.

Since all ID information is recorded in the data-to-business mapping file, it is possible to identify the identity of the user whose action causes a particular transaction to occur in the system. For example, if a particular database transaction is suspected to be part of an illegal transaction, the ID information in this particular database transaction can be used to compare with the information in the data-to-business mapping files. The data-to-business mapping file that contains the ID information for the particular database transaction can be retrieved and the user ID of this data-to-business mapping file will disclose the identity of the user whose action caused the suspicious database transaction.

Figure 10A:
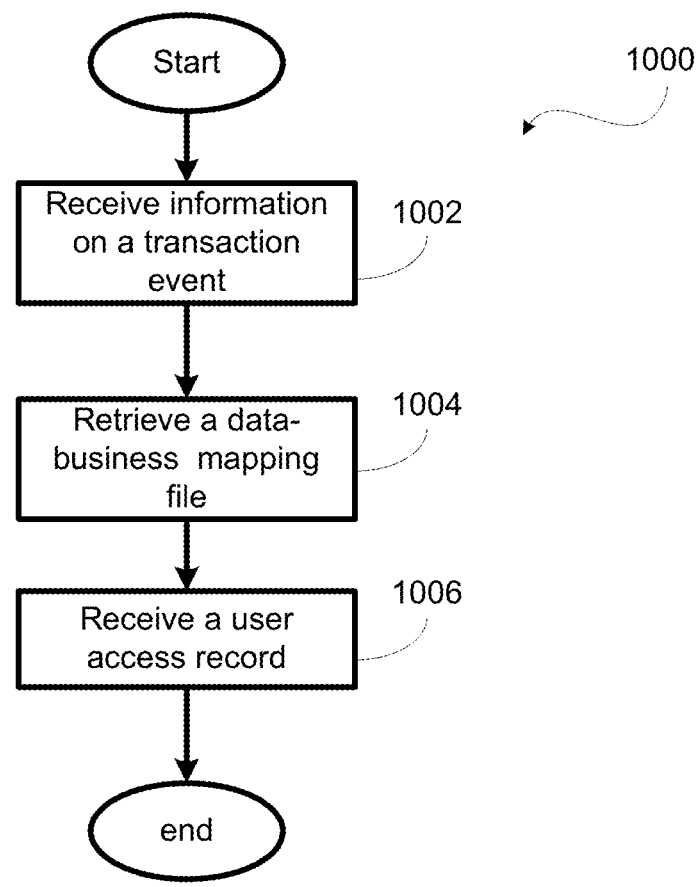
FIG. 10A is a process for retrieving a record corresponding to a user access.

Though not listed above, the system may collect and record the information on the application (program) that invoked database commands. The information may include the program name and other information in the following list:

DB Server
DB Client
DB Type
Client Port
Server Port
DB User ID
Client Program Name
Client OS User
Client System Name
AppUser ID
DB
Tables
Functions
Columns
Commands
SQL statements
Bind Variables
Response Messages
Number of rows
number of columns
Start Time
End Time
Response Time
Total time
Number of bytes Send
Number of bytes received
Connection ID
Session ID FIG. 10A illustrates a process 1000 for identifying a user access using the information collected by the system disclosed in the present invention. A information from a transaction event is received, step 1002, by the system when a system administrator wants to learn the user request associated with the transaction event. The transaction event can be a database transaction or any user transaction. Using the information in the transaction event, a data-to-business mapping file can be retrieved from a database, step 1004. Since the data-to-business mapping file has records of activities and connections associated with a particular user request, the user access record for the particular user request can be obtained, step 1006.

Figure 10B:
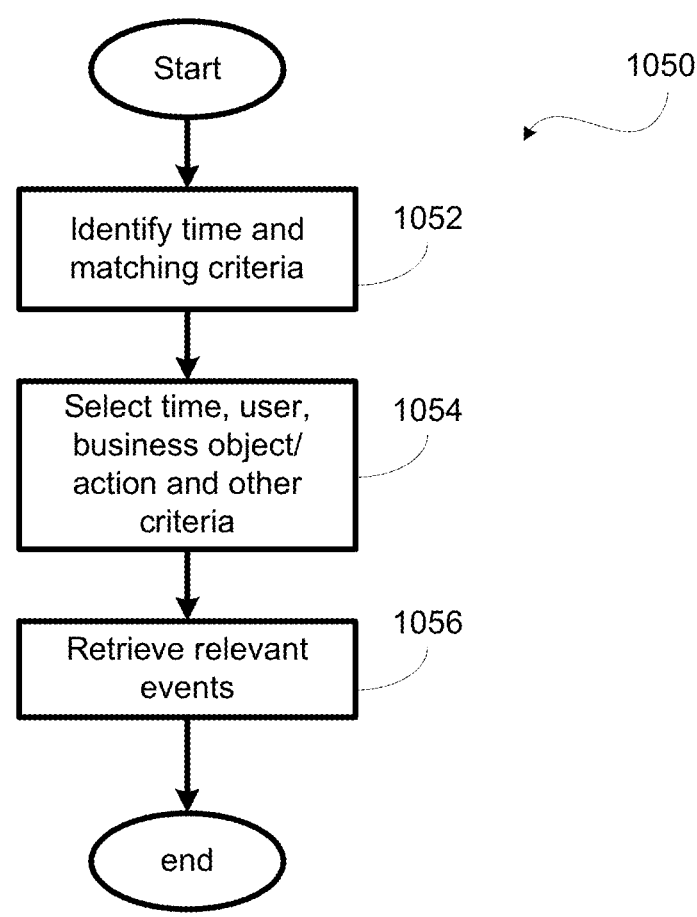
FIG. 10 B is a process for retrieve records for selected criteria.

FIG. 10B illustrates a data auditing process 1050 that retrieve relevant data transaction records (events). The present invention allows a system administrator to identify time and matching criteria, step 1052, which are fed to the system. The system administrator can also specify other criteria, such as user ID, time period, business transaction, etc, step 1054, and these criteria are used to retrieve relevant data transaction records from a stored database, step 1056. This auditing process enables system administrator to retrieve and check data transactions related to a business operation.

The identification of an event related to a data transaction may be made easier by recording additional business operation related information along with the transaction data. When a transaction data is collected, for example a transaction data reflecting a data request from a web server 606 to a database server 608, the system searches for the data-business mapping rule for this data request. After identifying the data-business mapping rule, a corresponding data-business mapping file can be retrieved. The transaction data from this data request can be identified and stored in this data-business mapping file. Because this data-business mapping file is available, the user identification and business operation information related to this data request can be retrieved from the data-business mapping file and stored as part of the transaction data of this data request. Using this approach, the transaction data for each and every data transaction in the system is saved with identification information about the user and also about the business transaction that caused the data transaction. The transaction data saved would be:

SavedTransData=(UserID; BusObjID)+(raw data from data transaction) where,
SavedTrasnData is the saved data for the data transaction;
UserId is the identification of the user; and
BusObjId is identification of a business command invoked.

Because of the saved transaction data includes identification of the user and of the business command/operation related to the data transaction, the processes described in FIGS. 10A and 10B become easier and faster. If the system administrator identifies a particular data transaction as suspicious, he can learn the identity of the user and the business operation promptly from the retrieved saved transaction data. People skilled in the art will appreciate that other identification information can also be saved with the raw data from the data transaction.

Figure 11:
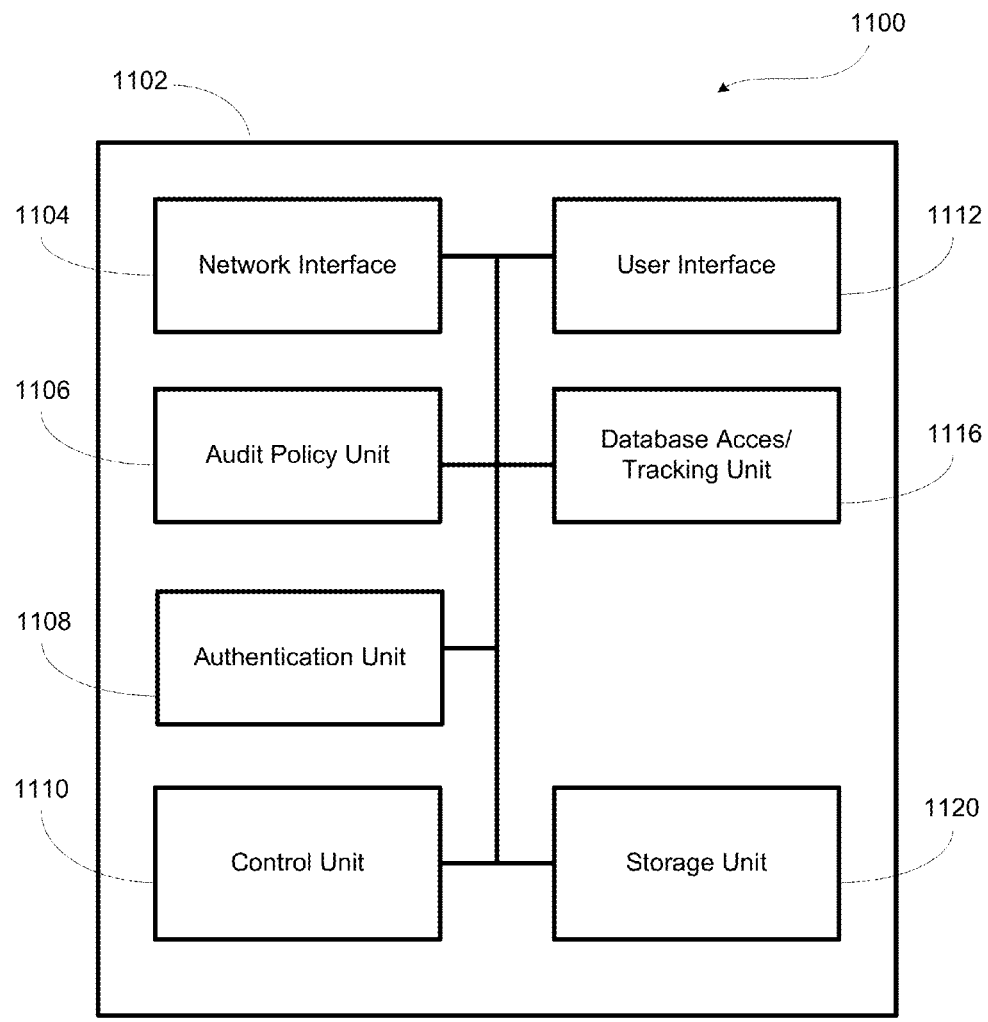
FIG. 11 is architecture of one embodiment of the present invention.

FIG. 11 illustrates architecture 1100 of a tracking server 1102 according to one embodiment of the present invention. The tracking server 1102 can be placed in the computer network shown in FIG. 6 and connected to the web servers 606a-606c and the database servers 608a-608d. The tracking server 1102 may also be embedded into any of the web servers or the database servers. The tracking server 1102 can monitor and track, inside the web servers and the database servers, activities or data transactions generated by a user request and also network activities between the web servers and the database servers related to the user request. The tracking server 1102 comprises a network interface 1104, an audit policy unit 1106, an authentication unit 1108, a control unit 1110, a user interface 1112, a database access/tracking unit 1116, and a storage unit 1120.

The network interface unit 1104 monitors network traffic, i.e., database access requests and responses travelling through the network. The audit policy unit 1106 controls audit policies/rules and the rules are used for tracking user access requests. The authentication unit 1108 authenticates the user and also checks whether there is a session open for the user. The user interface unit 1112 receives and displays information to and from a system administrator. The database access/tracking unit 1116 tracks database access requests and responses travelling through the network. The storage unit 1120 stores the audit policies/rules. The storage unit 1120 may also store a computer program that, when executed by the control unit 1110, controls the operation of components of the tracking server 1102. The storage unit may be any non-transitory storage unit, such as non-volatile memory, hard disk, or other suitable storage device.

According to one embodiment of the present invention, when a user invokes a business function in a system, the authentication unit 1108 authenticates the user and control unit 1110 checks whether there is a session already open for the user. If there is already a session open for the user, the control unit 1110 retrieves a data-to-business mapping file and stores the information for the current user access, which includes the business function invoked and the user ID, into the data-to-business mapping file. If there is no session opened for the user, the control unit 1110 created a session ID, opens a data-to-business mapping file, and associates it with the session ID. The audit policies/rules unit 1106 retrieves a rules file from the storage unit 1120 according to the function invoked by the user. The rules file is used by the tracking server 1102 to track the activities and database accesses generated by the business function invoked by the user. As the system processes the function invoked by the user, different database access requests may be sent from the system to one or more database servers. These database access requests and their respective responses are tracked by the database access/tracking unit 1116. Because all the transactions and database accesses are tracked and their essential information recorded, it becomes possible to identify the original business function associated with any database request or response.

The system and method described above enables a system administrator to audit events in the system and associate data transactions in the system with the business function that generated these data transactions. For example, if there is an abnormal access to a database, the information related to the database access request can be related back to a particular network traffic by searching the data-to-business mapping file. After identifying the data-to-business mapping file containing this abnormal database access request, it is possible to learn the business transaction, the user identification, the session identification, the entry point, etc. With this information, it is possible to retrieve the actual raw data saved for each of the operations and activities.

In the context of FIGS. 8-10, the steps illustrated do not require or imply any particular order of actions. The actions may be executed in sequence or in parallel. The method may be implemented, for example, by operating portion(s) of a network device, such as a network router or network server, to execute a sequence of machine-readable instructions. The instructions can reside in various types of signal-bearing or data storage primary, secondary, or tertiary media. The media may comprise, for example, RAM (not shown) accessible by, or residing within, the components of the network device. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media. The instructions when executed by a computer will enable the computer to perform the steps illustrated in FIGS. 8-10.

The units illustrated in FIG. 11 are described based on their function and these units may have different physical implementation, such as the units may be combined or implemented in different computers.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated. The combinations of different features described in different embodiments in this specification are foreseeable and within the scope of the invention.

What is claimed is:

1. A method for tracking user activities in a network system, comprising the steps of:
   detecting, by a tracking server at an entry point in the network system, a request from a user;
   retrieving, by the tracking server from a storage unit, a rule based on the entry point and the request;
   tracking, by the tracking server, user access information associated with the request according to the rule;
   tracking, by the tracking server, a connection identification between servers associated with the request;
   recording the user access information and the connection identification in a data-to-business mapping file; and
   creating a timer for a session identification, wherein when the timer expires the data-to-business mapping file is closed and a new data-to-business mapping file created.

2. The method of claim 1, further comprising the step of creating the session identification associated with the user identification for the user.

3. The method of claim 1, further comprising the steps of:
   determining whether there is a session identification associated with the user identification; and
   creating a session identification for the user identification if there is no session identification associated with the user identification.

4. The method of claim 1, wherein the tracking step further comprising the step of monitoring database access requests and database responses in the network system.

5. The method of claim 1, wherein the tracking the user access information step further comprising the step of obtaining identification information for activities generated from the request.

6. The method of claim 1, wherein the user access information comprises user login identification and the session identification.

7. The method of claim 1, wherein the step of detecting, by a tracking server at an entry point, a request from a user further comprises
   detecting a business operation invoked by the user at the entry point; and
   generating the request corresponding to the business operation.

8. A server for tracking user activities in a network system, comprising:
   a network interface unit for monitoring network traffic;
   an audit policy unit for controlling rules;
   a database tracking unit for database access requests and responses;
   a control unit; and a
   storage unit in which a non-transitory computer program is stored, wherein when the non-transitory computer program is executed by the control unit, the server performs the steps of:
      detecting, at an entry point, a request from a user,
      retrieving a rule associated with the request and the entry point,
      tracking user access information associated with the request according to the rule,
      tracking a connection identification between servers in the network system associated with the request,
      recording the user access information and the connection identification in a data-to-business mapping file; and creating a timer for a session identification, wherein when the timer expires the data-to-business mapping file is closed and a new data-to-business mapping file created.

9. The server of claim 8, wherein the server further performs the step of creating the session identification associated with an user identification for the user.

10. The server of claim 8, wherein the server further performs the steps of:
   determining whether there is a session identification associated with an user identification for the user; and
   creating a session identification for the user identification if there is no session identification associated with the user identification.

11. The server of claim 8, wherein the tracking user access information step further comprising the step of monitoring database access requests and database responses in the network system.

12. The server of claim 8, wherein the request is a business transaction invoked by the user.

13. The server of claim 8, wherein the tracking user access information step further comprising the step of obtaining identification information for activities generated from the request.

14. The server of claim 8, wherein the user access information comprises user login identification and the session identification.

* * * * *